United States Patent [19]
Rabinovich et al.

[11] Patent Number: 5,805,318
[45] Date of Patent: Sep. 8, 1998

[54] APPARATUS FOR DETERMINING THE EFFECT OF MODAL NOISE ON A COMMUNICATION SYSTEM BY FLEXING AN OPTICAL FIBER

[75] Inventors: Simon M. Rabinovich, Plano; David F. Smith, Dallas, both of Tex.

[73] Assignee: Honeywell Inc., Minneapolis, Minn.

[21] Appl. No.: 743,367

[22] Filed: Nov. 4, 1996

[51] Int. Cl.$^6$ .......................... H04B 10/08; H04B 10/12
[52] U.S. Cl. ..................... 359/110; 359/173; 356/73.1; 250/227.16
[58] Field of Search .................... 359/110, 173, 359/188, 195; 356/73.1; 250/227.16

[56] References Cited

U.S. PATENT DOCUMENTS

| | | | |
|---|---|---|---|
| 4,672,198 | 6/1987 | Presby | 356/73.1 |
| 4,996,420 | 2/1991 | Redford | 250/227.24 |
| 5,359,447 | 10/1994 | Hahn et al. | 359/154 |
| 5,633,494 | 5/1997 | Danisch | 250/227.16 |
| 5,703,682 | 12/1997 | Eslambolchi | 356/73.1 |

OTHER PUBLICATIONS article titled: "Bit–Error–Rate Degradation in a Multimode Fiber Optic Transmission Link Due to Modal Noise" by Koonen for the 1986 IEEE Journal.
An article by Epworth in "The proceedings of the 4th European conference on optical communications" 1978 pp. 492–501.

*Primary Examiner*—Kinfe-Michael Negash
*Attorney, Agent, or Firm*—William D. Lanyi; Roland W. Norris

[57] ABSTRACT

An apparatus is provided for causing a change in the physical condition of an optical fiber in order to analyze the effects of modal noise on a communication system in which the optical fiber is used. One method for performing the physical change is to flex the fiber in a flexing station that comprises two clamps that are attached to generally opposite sides of a multiple turn loop of optical fiber that is twisted to form a figure-eight pattern. The two clamps are moved away from each other and toward each other to flex the optical fiber by twisting, compressing and expanding it. A second means for changing the condition of the optical fiber is to provide an optical attenuation block that is designed to hold opposite termini of the optical fiber at a discontinuity formed therein. Two halves of the block are configured to be movable relative to each other in response to threaded members passing through selective portions of the block. Ferrules are attached with connectors, to the opposite termini that define the discontinuity and the ferrules are each attached to one portion of the block. By moving the halves of the block relative to each other, selective misalignments can be induced in the ferrule arrangement. In particular a combination of longitudinal, lateral and angular misalignment can be achieved.

15 Claims, 7 Drawing Sheets

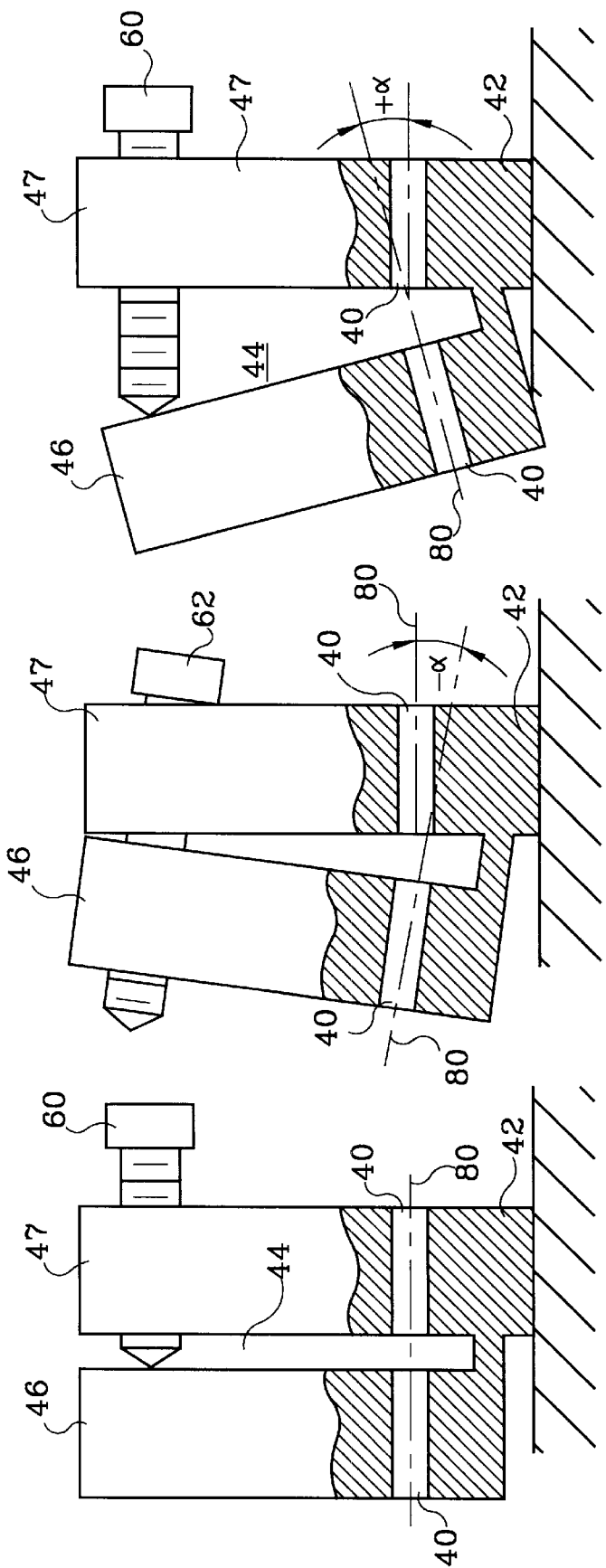
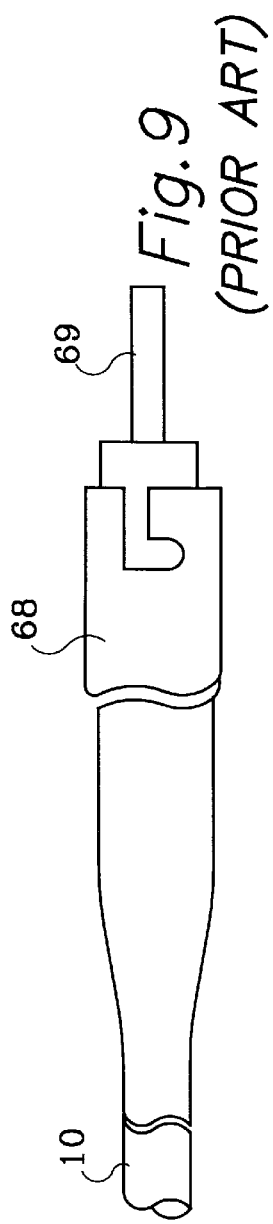
Fig. 8A  Fig. 8B  Fig. 8C
Fig. 9 (PRIOR ART)

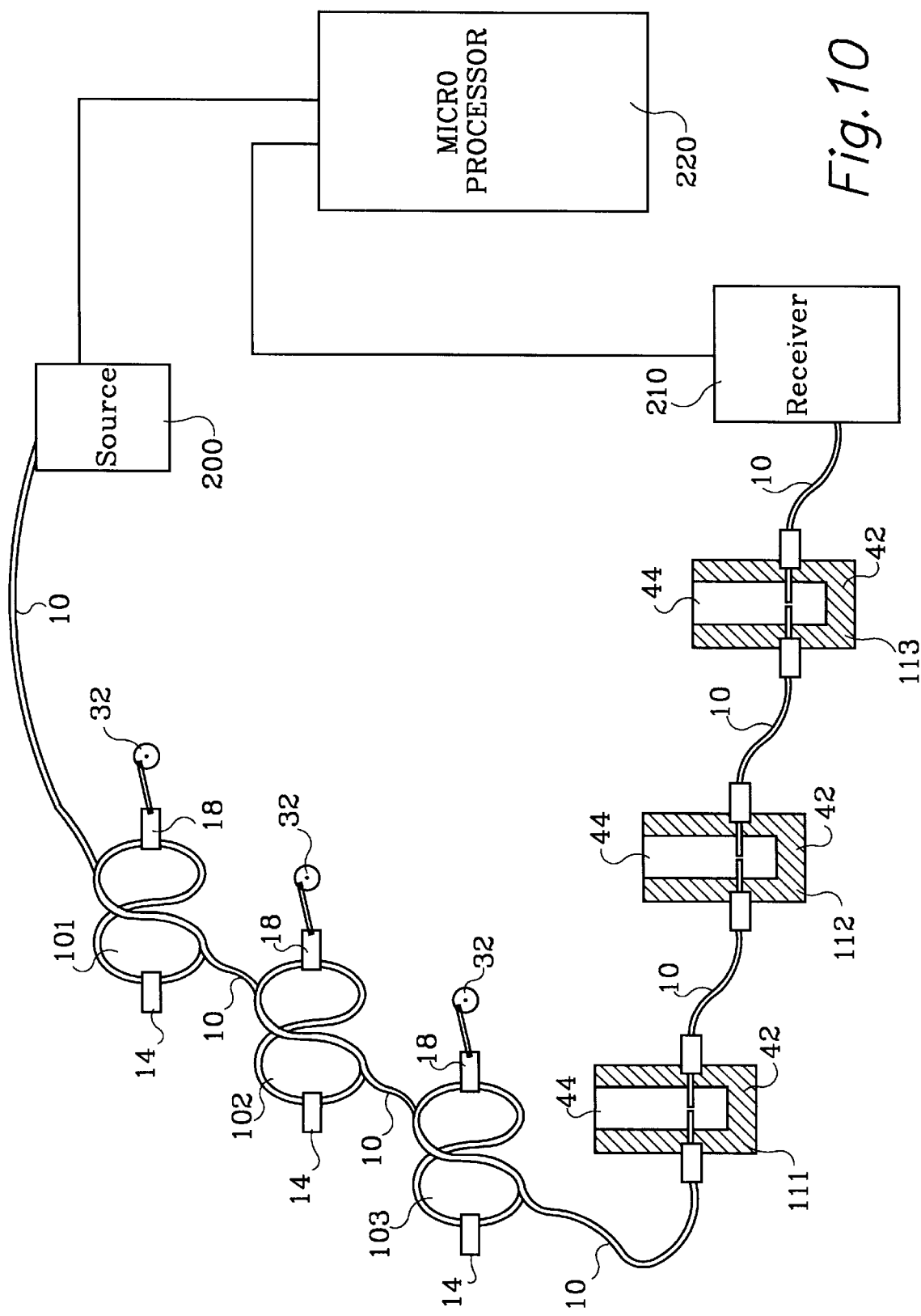

APPARATUS FOR DETERMINING THE EFFECT OF MODAL NOISE ON A COMMUNICATION SYSTEM BY FLEXING AN OPTICAL FIBER

BACKGROUND OF THE INVENTION

1. Field of the Invention

The present invention is generally related to a test apparatus and, more particularly, to an apparatus that causes a preselected change in the physical condition of an optical fiber that is connected between a source of an optical signal and an optical signal receiver for the purpose of determining the effect of the preselected change in the physical condition on the optical signal as it is transmitted through the optical fiber between the source and the receiver.

2. Description of the Prior Art

Modal noise in high speed laser-based fiber communication systems is recognized by those skilled in the art as a potential source of problem in the communication industry. It is therefore necessary to study and characterize the effects of modal noise on optical fiber communication systems which utilize high speed lasers. In order to study the effects of modal noise, it would therefore be beneficial if appropriate test procedures are developed that enable those skilled in the art to accurately determine the impact, or effect, of modal noise on the communication system.

The effects of modal noise on a communication system are caused when the spatial interference pattern, called a speckle pattern, resulting from the simultaneous propagation of many modes in an optical fiber, encounter any mechanism in the transmission path that allows some speckles to pass and blocks or scatters others. Such a mechanism is referred to as a mode selective loss (MSL). A mode selection loss can result from misaligned connectors, bends in the fiber, dirt at the interface between two fibers and any mechanism that does not transmit the propagating optical field uniformly. Modal noise results when this speckle pattern changes in the presence of MSL because it induces a change in the transmitted amplitude of the signal which is usually random in nature. Modal noise is severely exacerbated by changes in the physical condition of an optical fiber because they can result in unpredictable changes in the speckle pattern in the fiber and result in changes in how much light is transmitted along the fiber. These changes include either flexing of the cable or relative movement between opposite termini at a fiber discontinuity, or connection, of the cable system. In addition, thermal expansion of the fiber and changes in the optical wavelength due to thermal changes or modulation have similar effects. The flexing of an optical fiber can occur in many ways. During installation of a communication system, the optical fiber is typically extended through openings in walls, ceilings and floors and, because of the physical locations of the various optical transmitters and receivers, the optical fiber must be bent and distorted in order to traverse the path between the components of the communication system. Any mechanism, such as vibration, physical handling, drafts and breezes which cause the position of the optical fiber to change can deleteriously affect the integrity of the stream of optical signals passing through the fiber by inducing modal noise. In addition, when two optical fibers are connected together in signal communication with each other, it is common to use connectors attached to each of the opposing termini at a discontinuity position in the optical fiber. In a typical application, the connectors are designed to place the termini of the optical fiber in close aligned proximity with each other or with other components. If, for any reason, the connectors are not properly aligned with each other or with the other components, the termini of the optical fibers will not be in an appropriate alignment with each other and the integrity of the signal stream can be adversely affected. The phenomenon of Modal Noise was first described by Epworth in "The Proceedings of the $4^{th}$ European Conference on Optical communications" 1978 pp 492–501. It would therefore be beneficial if a test procedure and system could be developed to accurately determine the effects on a communication system caused by modal noise.

Some attempts have been made to reduce the effects of modal noise in systems. U.S. Pat. No. 5,359,447, which issued to Hahn et al on Oct. 25, 1994, discloses an optical communication system with a vertical cavity surface emitting laser operating in multiple transverse modes. The optical communication system uses a relatively large area vertical cavity surface emitting laser. The laser has an opening larger than approximately eight micrometers and is coupled to a multimode optical fiber. The laser is driven into multiple transverse mode operation, which includes multiple filamentation as well as classically molded operation. These lasers were designed in this manner to reduce the effects of modal noise by reducing coherence.

An article titled "Bit-Error-Rate Degradation in a Multimode Fiber Optic Transmission Link Due to Modal Noise" was written by Koonen for the 1986 IEEE Journal on Selected Areas in Communications, Volume SAC-4, No. 9. The article provides a review of the statistics of modal noise and of the expressions for the signal-to-noise ratio for the cases of a monochromatic and non-monochromatic light source including the effects of source frequency fluctuations. Using the results, a qualitative analysis of how modal noise degrades the bit-error-rate performance of a digital transmission link with multimode fiber. Plots of the bit-error-rate verses the received optical power show the characteristic asymptotic behavior. Expressions are derived for the asymptotic bit error rate (BER). The power penalty due to modal noise can be considerably reduced by suitable system modifications. For example, these improvements can be realized by optimization of the decision threshold setting or by application of a low coherent light source such as a LED or a laser diode operating with several spectral emission lines of low coherence and low partition noise.

SUMMARY OF THE INVENTION

An apparatus for determining the effect of modal noise on a communication system that is made in accordance with the present invention comprises a source of an optical signal and an optical signal receiver. It further comprises a preselected length of optical fiber connected in signal communicating association between the source and the receiver. The present invention further comprises a means for causing a preselected change in the physical condition of the optical fiber while the optical signal is being transmitted from the source to the receiver. The present invention also comprises a means for converting said changes in the physical condition of the fiber into intensity fluctuations thus determining the effect of the preselected change in the physical condition of the optical fiber on the optical signal as the optical signal is transmitted through the optical fiber between the source and the receiver.

In one particular embodiment of the present invention, the causing means comprises a means for repeatedly flexing a loop of the optical fiber. The loop of the optical fiber can comprise a plurality of turns which, taken together, form a loop that comprises a bundle that is made up of the single optical fiber repeatedly wound in a generally circular shape and then twisted to form a figure-eight shape.

The causing means can comprise a first clamp for gripping the loop of the optical fiber at a first location and a second clamp for gripping the loop of the optical fiber at a second location. In addition, the causing means comprises a means for moving the first location relative to the second location. The first and second locations can be diametrically opposite to each other with respect to the loop of the optical fiber. In addition, the first clamp can be stationary with the second clamp being reciprocally moved along a generally straight line path relative to the first clamp. The important thing is that this arrangement causes the fiber bundle to be linearly compressed and rotated at the same time giving a more thorough exploration of the speckle. In fact the movement causes the plane in which the figure of eight loop lies to rotate by 90 degrees.

Another portion of the present invention comprises a source for providing an optical signal, an optical signal receiving device, and a preselected length of optical fiber connected in signal communicating association between the source and the receiver with the optical fiber having a discontinuity along its length which is defined by first and second disconnected termini of the optical fiber. This embodiment of the present invention further comprises a means for causing a preselected change in the physical relationship of the first and second termini of the optical fiber while the optical signal is being transmitted from the source to the receiver. It further comprises a means for determining the effect of the preselected change in the physical condition of the optical fiber on the optical signal as it is transmitted through the optical fiber.

The causing means in this embodiment of the present invention can comprise a first means for retaining the first terminus at a first position relative to the causing means and a second means for retaining the second terminus at a second position relative to the causing means. The first retaining means and the second retaining means are separated by a gap. The first and second termini are positioned to transmit the optical signal between the first and second termini within the gap of the causing means. The present invention further comprises a means for changing the position of the first and second retaining means relative to each other.

The causing means can comprise a block having a gap, or slot, formed therein. The first and second retaining means are disposed on opposite sides of the gap and the changing means comprises a first threaded member for moving the first and second retaining means away from each other and a second threaded member for moving the first and second retaining means towards each other. The changing means can also comprise a means for changing the angular relationship between the first and second retaining means in order to change the angular relationship between the first and second termini.

In order to facilitate the transmission of light between the first and second termini, a first connector can be attached to the first terminus and a second connector can be attached to the second terminus. The first connector can comprise a first ferrule and the second connector can comprise a second ferrule, with the first and second ferrules being disposed proximate each other within the gap.

In certain applications of the present invention, more than one embodiment of the present invention can be combined together to more rigorously test the effect of modal noise on the communication system.

BRIEF DESCRIPTION OF THE DRAWINGS

The present invention will be more fully and clearly understood from a reading of the Description of the Preferred Embodiment in conjunction with the drawings, in which:

FIGS. 8A, 8B and 8C illustrate several distortions of the block of the present invention;

FIG. 9 shows a typical optical connector and ferrule for use with an optical fiber; and FIG. 10 shows a test system comprising a plurality of flexing stations and optical attenuation stations.

DESCRIPTION OF THE PREFERRED EMBODIMENT

Figure 1:
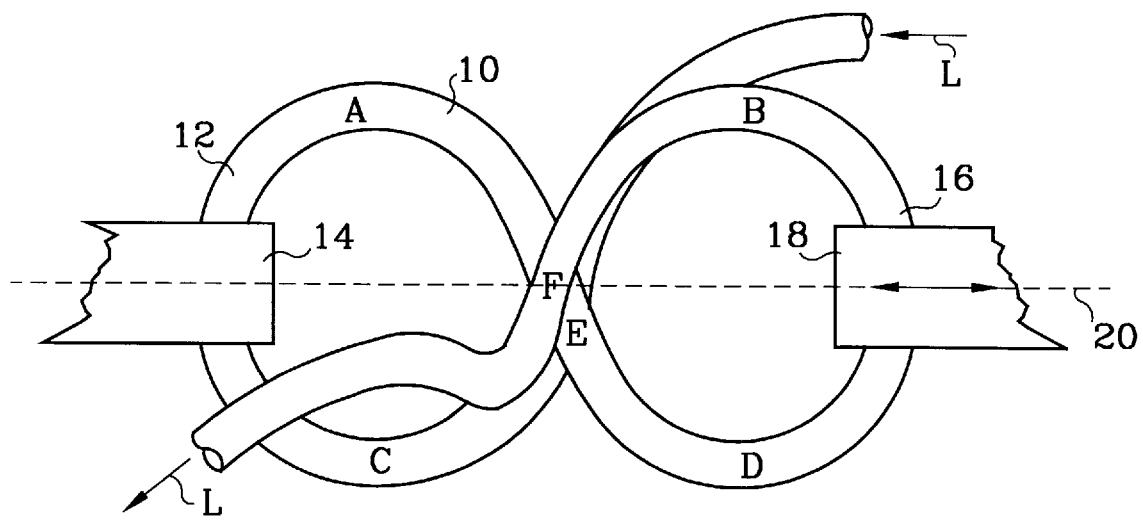
FIGS. 1 and 2 show two positions of a flexing station made in accordance with the present invention.

Throughout the Description of the Preferred Embodiment of the present invention, like components will be identified by like reference numerals. FIG. 1 shows a loop formed from an optical fiber 10. As shown in FIG. 1, the loop of the optical fiber 10 is twisted to form a figure-eight pattern. This pattern is formed by wrapping the optical fiber 10 a plurality of times in a generally circular pattern and then twisting one side of the loop to reverse its original direction. A first location 12 of the loop is gripped by a first clamp 14 and a second location 16 of the loop is gripped by a second clamp 18. If the second clamp 18 is moved reciprocally along a generally straight line 20, as represented by the arrow in FIG. 1, the loop of optical fiber 10 will be flexed in a manner that will exacerbate the effects of modal noise in the signal passing through the optical fiber 10 simultaneously with the flexing procedure. The passage of the optical signal is represented by arrows L in FIG. 1. It should be understood that, although FIG. 1 shows only a small portion of the total length of the optical fiber 10, a much longer segment of optical fiber would typically be tested at one time. In other words, the ends of the optical fiber shown in FIG. 1 would continue for a significant length and be connected to a source of an optical signal, an optical signal receiver and a means for interrogating the integrity of the optical signal as it passes through the optical fiber. In addition, it should be understood that, although FIG. 1 only shows a few turns of optical fiber 10 within the loop, certain applications of the present invention would include many more turns of the optical fiber. The number of turns in the loop could exceed 20 or more in many applications of the present invention. The purpose of the device shown in FIG. 1 is to perturb the optical fiber in a manner that changes the speckle pattern in the fiber in such a way that most of the different speckle states are excited. This will ensure that the worse case signal fading due to the speckle interacting with a mode selective loss is observed. The test is performed by forming multiple loops of the optical fiber and slowly compressing or extending the loops of fiber while twisting them simultaneously. The compression tends to make the speckle pattern vary homogeneously and the twisting tends to introduce a component of rotation into the pattern. This combination of twisting and compressing has proven to be necessary for the optimum performance of the embodiment shown in FIG. 1.

Figure 2:
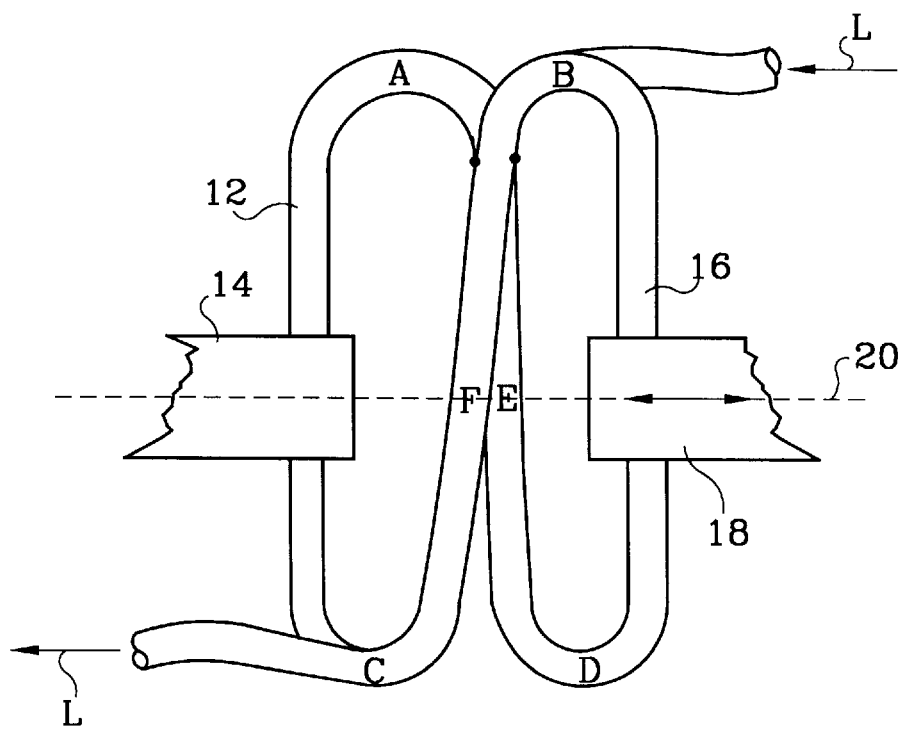

FIG. 2 shows the loop of optical fiber after the second clamp 16 has moved toward the first clamp 14. Comparing FIGS. 1 and 2, it can be seen that the movement of the second clamp 18 along the generally straight line 20 will cause a noticeable flexure in the loop of optical fiber. By comparing the positions of the optical fiber that are labeled as points A, B, C and D in FIGS. 1 and 2, it can be seen that points A and B have moved significantly toward each other and points C and D have moved significantly toward each other as a result of the movement of the second clamp 18. Two additional points are shown on the illustration of FIGS. 1 and 2. Point E is located halfway between points A and D, and point F is located halfway between points B and C. When the figure eight is not compressed, points A and B are at their greatest distance from each other, but when the loop is compressed points A and B are at their closest point to each other. By contrast, when the figure of eight is extended, points E and F are at their closest point to each other, but when the fiber is compressed they are at their most distant. However this clearly cannot be completely shown on a two dimensional surface like FIGS. 1 or 2. Points E and F can only separate by one of the points moving out of the plane of the paper with the other point moving into the plane of the paper. This produces a new figure eight where the plane of the loops is no longer in the sheet of paper, but is in a plane that is perpendicular to the plane of the paper. Hence the loop has actually rotated with only a simple linear motion of the actuator. This creates the compressions, extensions and twists in the optical fiber that are necessary to properly examine the effects of modal noise on the communication of optical signals through the fiber. Although the second clamp 18 has been described in terms of having a reciprocal motion along a generally straight line 20, it should be clearly understood that alternative motions of the second clamp with respect to the first clamp could also perform the necessary functions described above.

Figure 3:
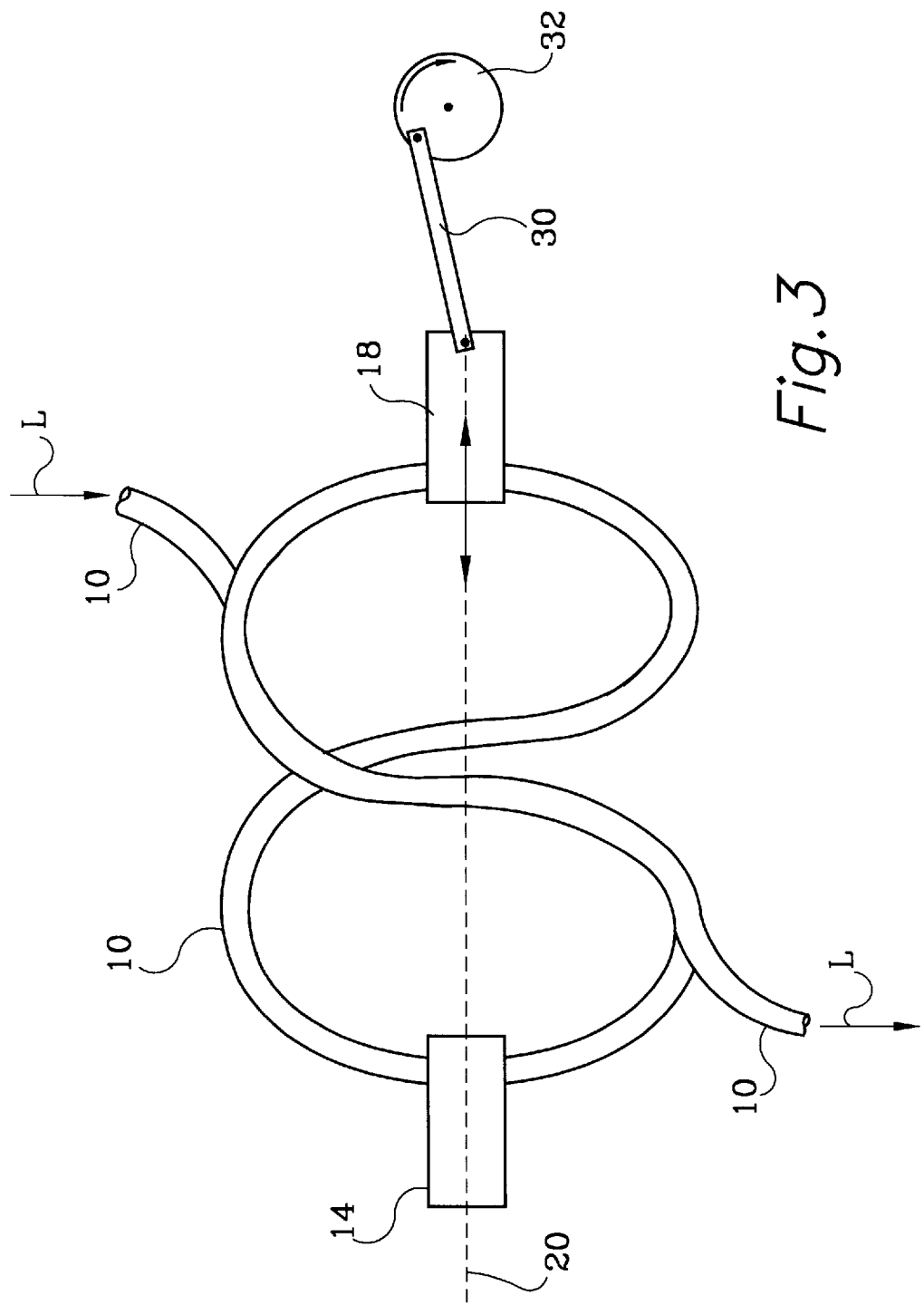
FIG. 3 shows the flexing station of FIGS. 1 and 2 with a means for reciprocating one of two clamps relative to the other clamp.

FIG. 3 is similar to FIGS. 1 and 2, but also shows a means for providing the reciprocal movement of the second clamp 18. The movable second clamp 18 can be connected to a linkage 30 that is, in turn, connected to a rotating wheel 32. In a manner that is well understood by those skilled in the art, rotation of the wheel 32 will cause the linkage 30 to push and pull the second clamp 18, as indicated by the arrow in FIG. 3, along the generally straight line 20. This provides the reciprocal path for the second clamp in order to repeatedly flex the loop of optical fiber 10 in the manner described above. The rate at which the loop is flexed is a function of the rotational speed of the wheel 32. The amount that the loop is flexed is a function of the diameter of the wheel 32 and the length of the linkage 30.

Figure 4:
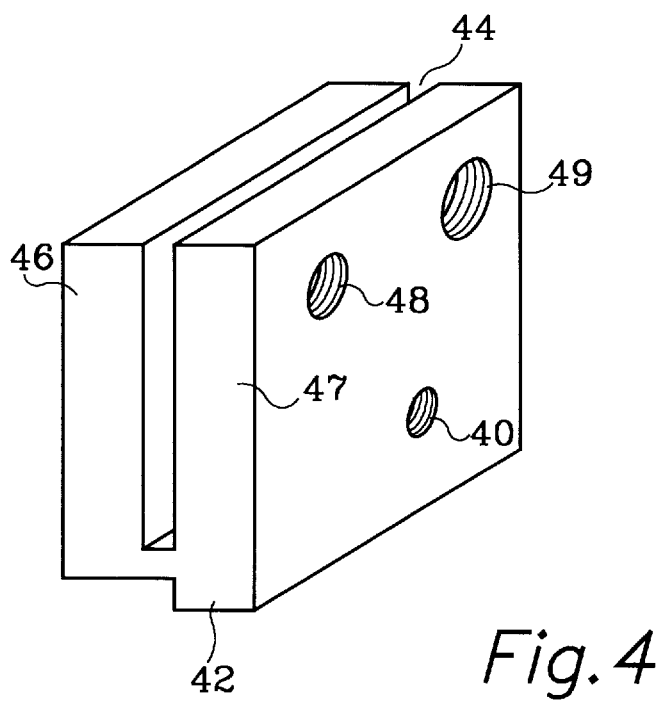
FIG. 4 shows a block used in one embodiment of the present invention.

Another way in which the effect of modal noise on a communication system can be tested is to create an offset loss in the cable as optical signals are being transmitted through the optical fiber. The offset loss must remain stable, within less than 0.25 dB over a temperature range from 0 degrees centigrade to 80 degrees centigrade. One embodiment of the present invention, developed specifically to accomplish this type of test, consists of several parts. With reference to FIG. 4, a hole 40 is drilled through a block 42 that is made of brass or another suitable material. The tolerance of the hole 40 is such that it provides a close fit for the ferrule of an industry standard connector. This type of connector comprises a ferrule as part of it. In addition, a slot 44 is machined into the block 42 in a direction that is generally perpendicular to the centerline of the hole 40. This permits the block to be formed into two halves, 46 and 47, which serve as retaining means for the ferrules. Two other holes, 48 and 49, are drilled into the block 42. One hole 48 is threaded within the second half 47, but does not extend through the first half 46. The other hole 49 is formed as a clearance hole through the second half 47, but is threaded as it extends into the first half 46. The purpose for these two holes, 48 and 49, will be described in greater detail below.

Figure 5:
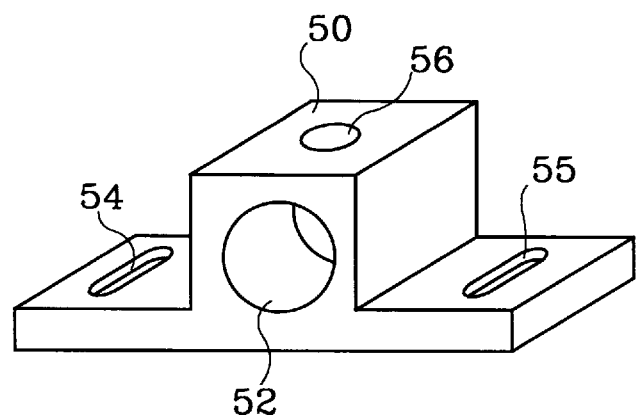
FIG. 5 shows a clamp used in one embodiment of the present invention.

FIG. 5 shows a connector clamp 50 that has a hole 52 formed through it to hold a connector body. Two elongated holes, 54 and 55, are provided to permit the clamp 50 to be attached to a stationary object, such as a work table. Another hole 56 is formed in the clamp 50 to permit a set screw to be used to clamp a connector of an optical fiber that is disposed through the hole 52.

Figure 6:
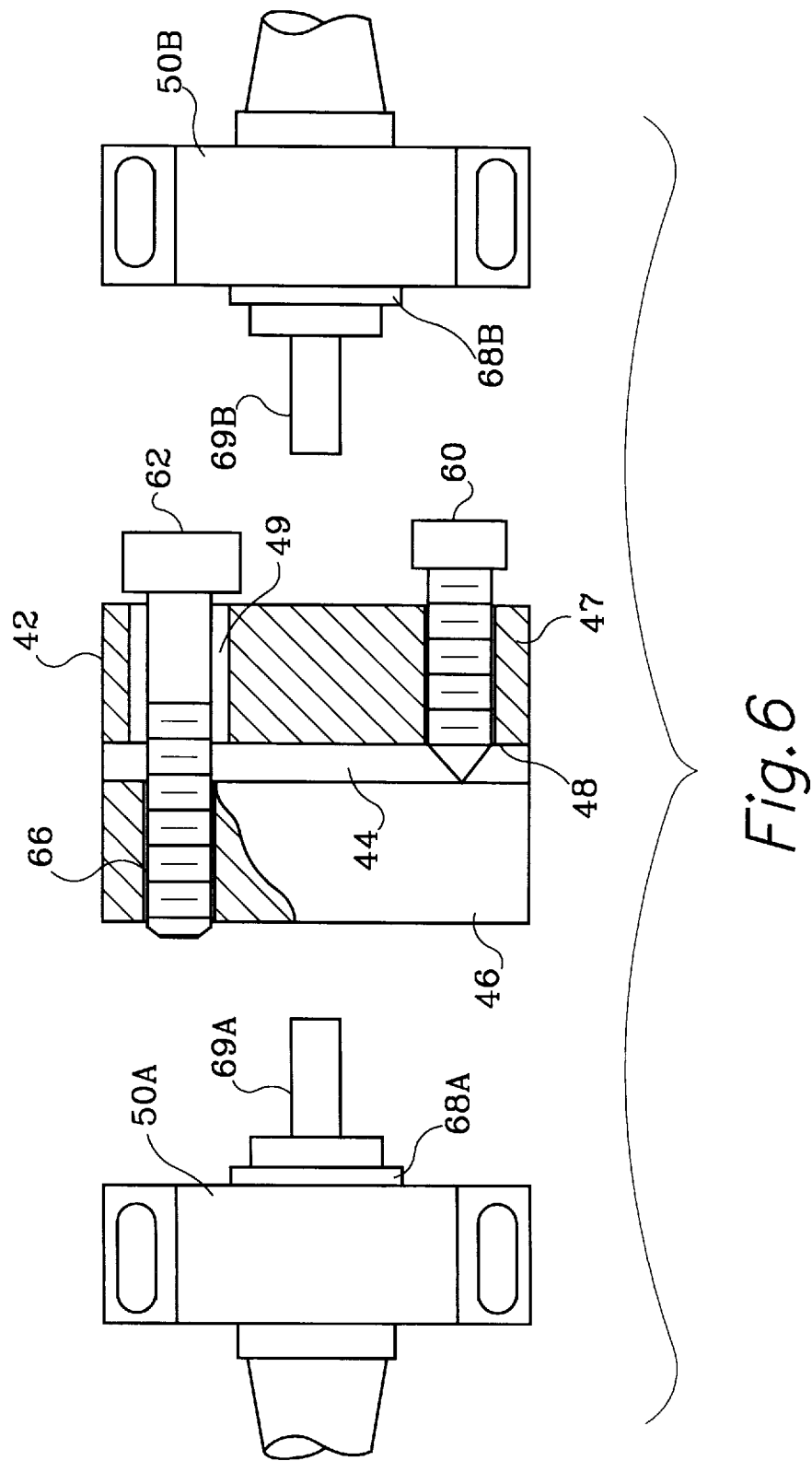
FIGS. 6 and 7 show two views of the block and clamps of the present invention used to retain and align two ferrules of an optical fiber at a preselected discontinuity of the optical fiber.

FIG. 6 shows an assembly and illustrates the block 42 with its first half, or retaining means 46, and its second half, or retaining means 47. As described above, the first hole 48 is threaded and extends through the second half 47, but does not extend into the first half 46. This allows a threaded member 60 to be threaded into the first hole 48 until it abuts the internal surface of the first half 46 after passing through the gap 44. A second threaded member 62 passes through the clearance hole 49 in the second half 47 and into a threaded hole 66 formed in the first half 46. As can be seen in FIG. 6, as the first threaded member 60 is threaded into its hole 48, it can push against the first half 46 and therefore push the first and second halves of the block 42 apart. The second threaded member 62, as it is threaded into hole 66 in the first half 46, will draw the two halves together. By selectively turning the first and second threaded members, 60 and 62, the relative positions of the first and second halves of the block 42 can be changed.

With continued reference to FIG. 6, two clamps, 50A and 50B, are shown with two connectors, 68A and 68B, disposed in the holes 52 of the clamps. Each of the connectors has a ferrule extending therefrom. The two ferrules, 69A and 69B, will be generally aligned with each other for the purpose of passing optical signals between them. It should be understood that FIG. 6 shows the clamps, 50A and 50B, separated from the block 42. However, as will be described in greater detail below, the ferrules, 69A and 69B, will be disposed within holes 40 on opposite sides of the block 42. The holes 40 are machined to receive the ferrules in a tight fitting relationship therein. This relationship assures that the two ferrules are properly aligned with each other as long as the first and second halves, 46 and 47, of the block 42 are not distorted with respect to each other.

Figure 7:
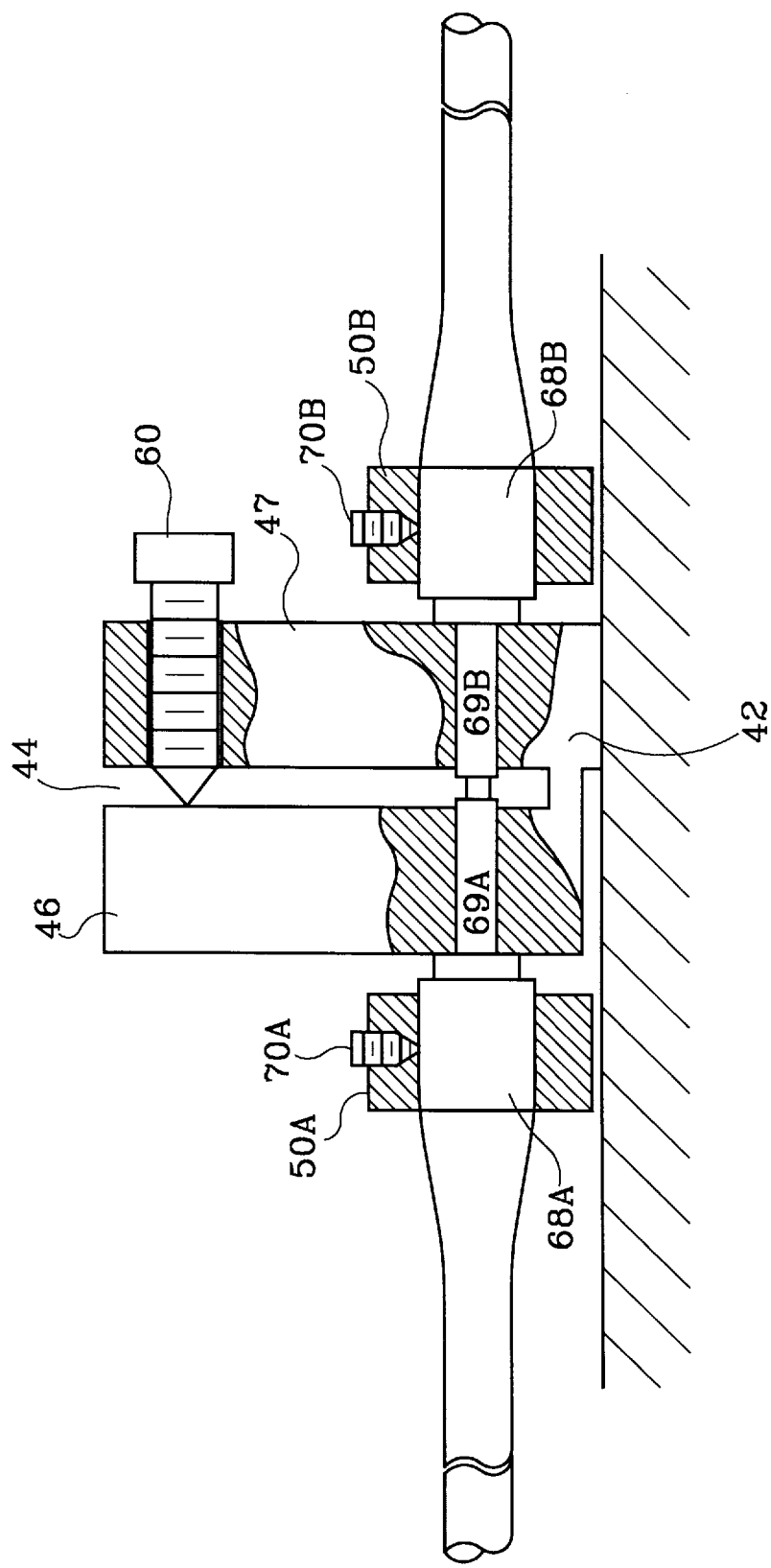

FIG. 7 shows the block 42 and the first and second clamps, 68A and 68B, associated together with the ferrules, 69A and 69B, disposed in the holes 40 of the block 42. The connectors, 68A and 68B, are disposed within the holes 52 of the clamps, 50A and 50B. Small set screws, 70A and 70B, are disposed in holes 56 of the clamps and screwed down to hold the connectors rigidly in place. The distal ends of the ferrules, 69A and 69B, are disposed in close proximate association with each other and arranged to permit optical signals to be transmitted from one ferrule to the other within the space provided by the gap 44, or slot, in the block 42.

FIGS. 8A, 8B and 8C illustrate the types of deflection of the block 42 that are possible. In FIG. 8A, the block 42 is not affected by either of the two threaded members, 60 or 62, and the first and second halves, 46 and 47, are generally aligned with each other on opposite sides of the gap 44, or slot, that is formed in the block 42. The hole 40 extends through both the first and second halves of the block 42 and the centerline 80 of hole 40 is straight and continuous through the hole 40 as it extends through both halves of the block 42. Although the ferrules, 69A and 69B, are not shown in FIG. 8A, it should be understood that the undistorted condition of the block 42 would leave the ferrules in proper alignment with each other as described above in conjunction with FIG. 7.

FIG. 8B shows the exaggerated view of the condition of the block 42 after threaded member 62 is tightened to draw the first and second halves, 46 and 47, toward each other. As can be seen, the original centerline 80 of hole 40 is severely distorted and an angle −α is formed between the centerlines of the holes 40 in each of the halves of the block 42. If the ferrules, 69A and 69B, are disposed within their respective holes 40, they would also be misaligned by angle −α.

FIG. 8C shows the block 42 after threaded member 60 is threaded into the second half 47 of the block. This pushes the first half 46 of the block 42 away from the first half and widens the gap, or slot 44. The hole 40 is distorted so that its two portions are no longer aligned with each other as they are shown in FIG. 8A. In FIG. 8C, the centerlines of the two holes 40 are misaligned by an angle identified as α. There are actually three types of misalignment that can possibly cause different effects on modal noise. One is a longitudinal misalignment, the second is a lateral misalignment, and the third is an angular misalignment. By a simple linear movement of two screws, all three types of misalignment can be induced.

With reference to FIGS. 8A, 8B and 8C, it can be seen that the block 42 can be selectively distorted to create precise misalignments between the ferrules of the optical connectors. This type of precise distortion can be advantageously used to determine the effects of the distortions at the fiber discontinuity defined by the two ferrules.

FIG. 9 is a simplified illustration of a typical connector 68 such as that identified by the nomenclature SC or ST. It comprises a ferrule 69 that is axially movable against the resistance of a spring contained within the outer cylinder of connector 68. The connector and its ferrule are attached to the optical fiber 10, with a terminus of the optical fiber 10 being disposed in optical communication with a central opening extending through the length of the ferrule 69.

FIG. 10 shows a test system that comprises several embodiments of the present invention. Reference numerals 101, 102 and 103 are used in FIG. 10 to represent individual flexing stations that each comprise the elements discussed above in conjunction with FIG. 3. Each of the flexing stations has an individual motor that drives a wheel 32 to reciprocate the second clamp 18. In a preferred embodiment of the present invention, each of the flexing stations, 101, 102 and 103, is caused to reciprocate the second clamp 18 at a different rate. For example, in one specific embodiment of the present invention, the wheel at flexing station 101 rotates at 55 RPM, the wheel 32 at the second flexing station 102 rotates at 63 RPM and the wheel 32 at the third flexing station 103 rotates at 73 RPM. These rates of rotation assure that the optical fiber which extends through the total system shown in FIG. 10 experiences many different combinations of flexure along its length. The invention however is not limited to the actual speeds used and can, in fact, be much slower or much faster.

With continued reference to FIG. 10, three optical attenuation stations, 111, 112 and 113, are also provided. Each of the attenuation stations comprises a block 42 similar to that described above in conjunction with FIGS. 4–7. Although the illustrations of the attenuation stations in FIG. 10 are highly simplified for purposes of clarity and simplicity, it should be understood that each of the attenuation stations, 111, 112 and 113, comprise the components described above in conjunction with FIGS. 4–7. The attenuations provided by these three optical attenuation stations misalign the associated termini and ferrules at each of the stations. As described above, the discontinuities in the optical fiber 10 are defined by the opposing disconnected termini at each discontinuity. Each of the three discontinuities in FIG. 10 are disposed within an associated gap 44, or slot, in the block 42.

In FIG. 10, a source 200 of an optical signal transmits the optical signal through the fiber 10. An optical signal receiver 210 is shown connected to the optical fiber 10. After transmission by the source 200, the optical signal passes through the optical fiber 10, each of the flexing stations, 101, 102 and 103, and each of the optical attenuation stations, 111, 112 and 113, before being received by the optical signal receiver 210. The use of multiple flexing stations and multiple optical attenuation stations provides a test that enables one skilled in the art to accurately determine the effect on the communication system caused by the modal noise within the optical signal which is selectively exacerbated by the flexing stations and the optical attenuation stations. FIG. 10 also shows a microprocessor 220 which is connected in signal communication with the source 200 and the receiver 210 for the purpose of accurately analyzing the differences between the transmitted signal from the source 200 and the received signal at the receiver 210 and determining the precise effect on the integrity of the optical signal caused by the flexing stations and the optical attenuation stations. This can measure virtually any appropriate measure of degradation of the signal integrity such as BER.

Two systems have been built. The first is a reference arm which contains no mode selective loss, and the second is the system with the attenuation blocks included. The results of one system can then be compared to the other to measure the effective power penalty required to achieve the same BER. The BER is generally measured in errored bits/sec or errored bits/number of transmitted bits.

It should be understood that, although FIG. 10 shows three flexing stations and three optical attenuation stations, other arrangements are within the scope of the present invention. For example, a single optical attenuation station may be preferable in order to more accurately define a precise effect of a certain amount of misalignment between the ferrules. In addition, it should be understood that, although the flexing stations have been described in terms of relatively few turns of fiber in each loop, many preferred embodiments of the present invention utilize dozens of turns of optical fiber in each of the loops. Although the present invention has been described in considerable detail and illustrated with particular specificity to show several embodiments of the present invention, it should be understood that many other embodiments are also within its scope.

The system is set up by calibrating each attenuation block using an LED. In one specific case the operator attempts to achieve a 1 dB loss per block for a total of 3 dB loss. The LED is then replaced by the laser to be tested, and the power level to reach a BER of 1 in $10^{10}$ is measured through a system which does not contain the MSL blocks. The same measurement is performed through the link with the MSL and fiber shaker and the power required to reach the same BER is noted. The difference between the two powers is the penalty which should not exceed a specified number.

The present invention permits testing to determine how well a particular laser will perform in a given standardized link. The MSL blocks represent worst case connectors, and the fiber shaker is intended to represent the constantly changing conditions that a link will see.

Although FIG. 10 does not illustrate it, it should be understood that the total length of the optical fiber extending between the source 200 and the receiver 210 can be considerably long. For example, in certain applications of the present invention, reels of the optical fiber are disposed between the source 200 and the first flexing station 101 and between the receiver 210 and the third optical attenuation station 113. In addition, a reel of fiber can be disposed between the third flexing station 101 and the first optical attenuation station 111. Typically, about 10 meters of fiber are placed between the source 200 and the first MSL block since that actually represents the most sensitive position for modal noise. The 200 meters is placed after the MSL blocks since it decoheres the light enough to make other optical components that may have MSL insignificant contributors of modal noise. Although not directly relevant to the present invention, this fact is discussed to emphasize that large quantities of optical fiber can be used in association with a test system such as that shown in FIG. 10. For example, each of the reels of optical fiber can contain over 200 meters of fiber. In addition, several meters of optical fiber are typically disposed between the various positions shown in FIG. 10. Also, it should be understood that between two and three meters of optical fiber are typically disposed in each of the loops within the flexing stations, 101, 102 and 103.

The embodiments of the invention in which an exclusive property or right is claimed are defined as follows:

1. Apparatus for determining the effect of modal noise on a communication system, comprising:

a source of an optical signal;

an optical signal receiver;

a preselected length of optical fiber connected in signal communicating association between said source and said receiver;

means for causing a preselected change in the physical condition of said optical fiber while said optical signal is being transmitted from said source to said receiver; and means for determining the effect of said preselected change in the physical condition of said optical fiber on said optical signal as said optical signal is transmitted through said optical fiber between said source and said receiver.

2. The apparatus of claim 1, wherein:

said causing means comprises a means for repeatedly flexing a loop of said optical fiber.

3. The apparatus of claim 2, wherein:

said loop of said optical fiber comprises a plurality of turns of said optical fiber.

4. The apparatus of claim 2, wherein:

said causing means comprises a first clamp for gripping said loop of said optical fiber at a first location of said loop and a second clamp for gripping said loop of said optical fiber at a second location of said loop; and means for moving said first location relative to said second location.

5. The apparatus of claim 4, wherein:

said first and second locations are diametrically opposite to each other with respect to said loop.

6. The apparatus of claim 4, wherein:

said first clamp is stationary and said second clamp is reciprocally movable along a generally straight line path relative to said first clamp.

7. Apparatus for determining the effect of modal noise on a communication system, comprising:

a source of an optical signal;

an optical signal receiver;

a preselected length of optical fiber connected in signal communicating association between said source and said receiver;

means for causing a preselected change in the physical condition of said optical fiber while said optical signal is being transmitted from said source to said receiver, said causing means comprising a means for repeatedly flexing a loop of said optical fiber; and means for determining the effect of said preselected change in the physical condition of said optical fiber on said optical signal as said optical signal is transmitted through said optical fiber between said source and said receiver.

8. The apparatus of claim 7, wherein:

said loop of said optical fiber comprises a plurality of turns of said optical fiber.

9. The apparatus of claim 7, wherein:

said causing means comprises a first clamp for gripping said loop of said optical fiber at a first location of said loop and a second clamp for gripping said loop of said optical fiber at a second location of said loop; and means for moving said first location relative to said second location.

10. The apparatus of claim 9, wherein:

said first and second locations are diametrically opposite to each other with respect to said loop.

11. The apparatus of claim 9, wherein:

said first clamp is stationary and said second clamp is reciprocally movable along a generally straight line path relative to said first clamp.

12. Apparatus for determining the effect of modal noise on a communication system, comprising:

a source of an optical signal;

an optical signal receiver;

a preselected length of optical fiber connected in signal communicating association between said source and said receiver;

means for causing a preselected change in the physical condition of said optical fiber while said optical signal is being transmitted from said source to said receiver, said causing means comprising a means for repeatedly flexing a loop of said optical fiber, said causing means comprising a first clamp for gripping said loop of said optical fiber at a first location of said loop and a second clamp for gripping said loop of said optical fiber at a second location of said loop and said causing means comprising means for moving said first location relative to said second location; and means for determining the effect of said preselected change in the physical condition of said optical fiber on said optical signal as said optical signal is transmitted through said optical fiber between said source and said receiver.

13. The apparatus of claim 12, wherein:

said loop of said optical fiber comprises a plurality of turns of said optical fiber.

14. The apparatus of claim 12, wherein:

said first and second locations are diametrically opposite to each other with respect to said loop.

15. The apparatus of claim 12, wherein:

said first clamp is stationary and said second clamp is reciprocally movable along a generally straight line path relative to said first clamp.

* * * * *